United States Patent
Dolden et al.

[11] Patent Number: 5,508,329
[45] Date of Patent: Apr. 16, 1996

[54] STABILIZED POLYKETONE COMPOSITION

[75] Inventors: John G. Dolden, Guildford; Philip K. G. Hodgson, Walton-on-Thames, both of England

[73] Assignee: BP Chemicals Limited, London, England

[21] Appl. No.: 175,429

[22] PCT Filed: Jul. 7, 1992

[86] PCT No.: PCT/GB92/01230

§ 371 Date: Jan. 7, 1994

§ 102(e) Date: Jan. 7, 1994

[87] PCT Pub. No.: WO93/01239

PCT Pub. Date: Jan. 21, 1993

[30] Foreign Application Priority Data

| Jul. 8, 1991 | [GB] | United Kingdom | 9114724 |
| Oct. 3, 1991 | [GB] | United Kingdom | 9121050 |

[51] Int. Cl.⁶ .................................................. C08K 5/17
[52] U.S. Cl. ............................................. 524/204; 524/381
[58] Field of Search ................................. 524/381, 204

[56] References Cited

U.S. PATENT DOCUMENTS

| 3,361,729 | 1/1968 | Takashima et al. | 524/381 |
| 4,104,247 | 8/1978 | Kato | 524/381 |
| 4,543,440 | 9/1985 | Loomis | 528/539 |
| 4,622,072 | 11/1986 | Turner | 524/399 |
| 4,631,087 | 12/1986 | Turner | 524/399 |
| 4,761,448 | 2/1988 | Kluttz et al. | 524/612 |
| 4,994,513 | 2/1991 | Syrier et al. | 524/210 |
| 5,232,968 | 8/1993 | Davidson | 524/381 |

FOREIGN PATENT DOCUMENTS

| 118312 | 9/1984 | European Pat. Off. |
| 310166 | 4/1989 | European Pat. Off. |
| 326224 | 8/1989 | European Pat. Off. |
| 489517 | 6/1992 | European Pat. Off. |

*Primary Examiner*—Veronica P. Hoke
*Attorney, Agent, or Firm*—Brooks Haidt Haffner & Delahunty

[57] ABSTRACT

A polymer composition stabilized against degradation during melt processing comprises a major amount of a polymer of carbon monoxide and at least one olefin and a minor amount of a stabilizer. The stabilizer can be a mixture of an aluminum trailalkoxide or hydrolysis product thereof with a amine, preferably a $C_{12}$ to $C_{20}$ amine; alternatively the stabilizer can be the reaction product of an aluminum alkoxide and an amine, preferably a $C_1$ to $C_{20}$ amine, or it can be a compound of the formula $Al(OR^x_2)(NR^3R^4_y)$.

13 Claims, No Drawings

STABILIZED POLYKETONE COMPOSITION

The present invention relates to a stabilised polymer composition containing a polymer of carbon monoxide and one or more olefins. In particular the invention relates to compositions containing such polymers which exhibit good melt processing stability in processes during which the composition is melted and subsequently solidified.

The preparation of random copolymers comprised of a minor mount of carbon monoxide and a major mount of ethylene by catalysed radical polymerisation has been known for some years. More recently it has been found that linear alternating polymers of carbon monoxide and one or more olefins, hereafter called polyketones, can be prepared by contacting the reactants with a Group VIII metal catalyst preferably comprised of palladium and a bidentate phosphine, see for example EP 121965.

The polyketones prepared by this process, whilst being thermoplastics, suffer from the disadvantage that they have relatively high melting points which are close to the temperatures at which they undergo chemical degradation. This causes a problem since the materials are thus difficult to process using conventional melt technology.

In order to overcome this problem a number of potential approaches have been explored. EP 213671 teaches that polyketones comprised of carbon monoxide, ethylene and alpha olefin (e.g. propylene) units have lower melting points than corresponding copolymers comprised only of carbon monoxide and ethylene units. Whilst this approach goes some way to alleviating the problem, there is still a need to improve further the melt processing stability of polyketones if they are to be processed on a commercial scale.

Methods of further improving melt processability have centred around a) the blending of polyketones with other polymers, b) the addition of plasticisers and c) the use of additives claimed to interfere with the degradation reactions which the polyketones undergo. The first two types of approach suffer in that relatively large amounts of the second polymer or plasticiser are required, a consequence of which is that there is a general deterioration in the physical, mechanical and barrier properties of the polyketone. An example of the third type of approach is disclosed in EP 310166. This patent teaches the addition of an aluminium alkoxide or a derivative thereof. Examples of preferred additives are those having the general formula $Al(OR)_3$ where each R is independently $C_1$ to $C_{12}$ alkyl. A disadvantage of this approach is, however, that it has only limited effectiveness. For example, we have found that whilst there is a stability increase in using up to 2% of such materials with the polyketones, there is no substantial further benefit obtained when higher levels were used.

It has now been found that the melt processability of polyketone blends containing an aluminium alkoxide can be improved further by addition of an additive comprising a $C_{12}$ to $C_{20}$ amine.

According to the present invention there is provided a polymer composition stabilised against degradation during melt processing which comprises (a) a major amount of a polymer of carbon monoxide and at least one olefin, (b) a minor amount of a first stabiliser comprising an aluminium trialkoxide or an aluminium containing hydrolysis product thereof and (c) a minor amount of a second stabiliser comprising an aliphatic amine, preferably $C_{12}$ to $C_{20}$ aliphatic amine.

Furthermore, it has been found that the reaction product obtainable by reacting an aluminium alkoxide with an amine, preferably a $C_6$ to $C_{20}$ amine can also be used to improve the melt processability of polyketones.

According to a further aspect of the present invention there is provided a polymer composition stabilised against degradation during melt processing which comprises (a) a major amount of a polymer of carbon monoxide and at least one olefin and (b) a minor amount of a polymer stabiliser characterised in that the polymer stabiliser is the product obtainable by reacting an aluminium alkoxide with an amine, preferably a $C_6$ to $C_{20}$ amine, or an aluminium containing hydrolysis product thereof.

The present invention solves the problem of improving the melt processability of polyketones by addition of aluminium/nitrogen stabilisers.

By the term polymer of carbon monoxide and at least one olefin mentioned above is meant any polymer containing units derived from carbon monoxide on the one hand and units arising from the olefin(s) on the other. This definition includes both random polymers produced by radical polymerisation and the polyketones referred to above. However the use of the combination of the stabilisers defined above is particularly effective when applied to polyketones. For the purposes of this patent, polyketones are defined as linear polymers having an alternating structure of (a) units derived from carbon monoxide and (b) units derived from one or more olefins. Suitable olefin units are those derived from $C_2$ to $C_{12}$ alpha-olefins or substituted derivatives thereof or styrene or alkyl substituted derivatives of styrene. It is preferred that such olefin or olefins are selected from $C_2$ to $C_6$ normal alpha-olefins and it is particularily preferred that the olefin units are either derived from ethylene or most preferred of all from a mixture of ethylene and one or more $C_3$ to $C_6$ normal alpha-olefin(s) especially propylene. In these most preferable materials it is further preferred that the molar ratio of ethylene units to $C_3$ to $C_6$ normal alpha-olefin units is greater than or equal to 1 most preferably between 2 and 30.

The polyketones described above are suitably prepared by the processes described in EP 121965 or modifications thereof. In general terms, this comprises reacting carbon monoxide and the chosen olefin(s) at elevated temperature and pressure with a catalyst which is preferably comprised of palladium, a bidentate phosphine, such as bis(diphenylphosphino)propane, and an anion which either does not coordinate to the palladium or coordinates only weakly. Example of such anions include p-toluenesulphonate, tetrafluoroborate, borosalicylate and the like. The process is suitably carried out at a temperature in the range 50° to 150° C., a pressure in the range 25 to 75 bar gauge and in a solvent such as methanol, acetone, THF or the like.

As regards the case where a first stabiliser (b), an aluminium trialkoxide or derivative thereof and a second stabiliser (c) an aliphatic amine, preferably a $C_{12}$ to $C_{20}$ aliphatic amine are used, the first stabiliser is suitably an aluminium alkoxide having the general formula $Al(OR^1)_3$ where the $R^1$ groups are independently $C_3$ to $C_{36}$ alkyl groups or substituted derivatives thereof. Preferably the R groups are independently $C_3$ to $C_{12}$ alkyl groups or substituted derivatives thereof. The alkyl groups may contain primary, and/or secondary and/or tertiary carbon atoms as the case may be.

Most preferred examples of the first stabiliser (b) are compounds having the general formula given above where the R groups are identical secondary alkyl groups having 3 to 8 carbon atoms. Of these compounds, most preferred of all is aluminium trisisopropoxide. The hydrolysis products of aluminium trialkoxides can also be used, e.g. pseudo boehmite.

The amount of aluminium alkoxide used should be in the range 0.1 to 10 parts per hundred parts of the composition, preferably 0.3 to 3, most preferably 1.0 to 2.0.

Turning to the second stabiliser (c) this can in principle be any amine having from twelve to twenty carbon atoms especially those which are aliphatic. Preferred examples are primary aliphatic amines most preferably $C_{14}$ to $C_{20}$ aliphatic amines, for example, 1-octadecyl amine. The amount of second stabiliser (c) used should preferably be in the range up to 0.5 parts per hundred parts of composition preferably from 0.05 to 0.3 parts. It is preferred that the ratio of stabiliser (b) to stabiliser (c) is in the range 20:1 to 0.5:1, preferably about 10:1.

Alternatively, the product obtainable by reacting an aluminium alkoxide with an amine preferably a $C_6$ to $C_{20}$ amine or the aluminium-containing hydrolysis product thereof can also be used as a stabiliser. Suitable examples of aluminium alkoxides are compounds having the general formula $Al(OR^2)_3$ where the $R^2$ groups are independently $C_1$ to $C_{20}$ alkyl, phenyl or substituted phenyl. Most preferred are those compounds in which the R groups are independently $C_1$ to $C_6$ alkyl or phenyl. Particularly convenient compounds are those in which the $R^2$ groups are $C_1$ to $C_4$ alkyl.

Turning to the amine, this can be in principle any amine having up to twenty carbon atoms. Especially suitable are aliphatic amines especially those which are primary or secondary aliphatic amines having from 6 to 20 carbons.

Where the stabiliser is the product obtainable by reacting an aluminium alkoxide and an amine as described above the stabiliser can be prepared, for example, by reacting the amine and the aluminium derivative together in an appropriate inert solvent such as petrol, toluene, xylene, etc. The temperature of reaction will depend upon the exact nature of the amine and aluminium compound used, however, normally a temperature in the range 0° to 120° C. will be sufficient. Initial mixing of the reactants should preferably be carried out below room temperature. Thereafter the temperature can be raised as appropriate to ensure that the reaction goes to completion. An alternative method of preparation involves the reaction of an aluminium hydride, alkyl or halide of formula $AlX_3$ (X= alkyl, Cl, H) with a mixture of the appropriate alcohol and amine.

After reaction is complete the stabiliser can be separated from the solvent and unreacted starting materials using known techniques such as distillation.

The reaction product will be of the general formula $Al(OR^2)_x(NR^3R^4)_y$ where x=0, 1-2 and y=3-x where $R^2$ is as defined above and the group $NR^3R^4$ are derivable from a primary or secondary amine, preferably having 6 to 20 carbon atoms, and $R^3$, $R^4$ are independently alkyl or aryl groups, preferably alkyl groups, e.g. isopropyl.

Whilst not wishing to be bound by theory, it is believed that the aluminium nitrogen compounds produced by this process are polymeric adducts, possibly trimers, of compounds of formula $AlX'_3$ where the X' groups are independently OR or amino groups derived from the amine by removal of one of the active hydrogen atoms with at least one X' group being an amino group. In the case where the amine is a primary amine the compounds may also be polyamine adducts of compounds of formula $X_2Al-Y-AlX_2$ where the X groups are independently as defined above without the proviso and Y is an amino group derived from a primary amine by removal of both its active hydrogen groups. The process defined above will, depending upon the conditions used produce either a pure product of a defined molecular formula or a mixture of such compounds. Both the pure forms and mixtures can be used as stabilisers.

Where the stabiliser is the product obtainable by reacting an aluminium alkoxide with an amine as described above, the amount of stabiliser to be used in the polymer composition is typically in the range 0.1 to 10 parts per hundred parts of polymer, preferably 0.3 to 3.

The stabilisers can be incorporated into the polyketone by essentially any known method provided that intimate mixing is achieved. In this respect in the case where two stabilisers (b) and (c) as defined above are used, a very convenient method of introducing them is by addition at a temperature above the melting point of the first stabiliser (b). Thus if the first stabiliser (b) is aluminium isopropoxide a temperature in excess of 118° C., preferably in the range 125° to 180° C. should be used.

Alternatively, the stabilisers can be incorporated by blending finely divided stabiliser with polyketone powder in a high speed mixer (e.g. Papenmeir Universal High Speed Mixer). In such cases, blending should preferably be carried out with mixing at a speed of 1000 to 2500 rpm.

The improved stability of the composition of the present invention compared to the original polyketone manifests itself for example as a lower rate of increase in torque at a given temperature when measured in a Brabender torque mixer.

In addition to the components defined above, the composition may contain further additives such as antioxidants, blowing agents, mould release agents and other materials conventional in the art.

The compositions of the present invention may be readily melt processed and hence can be used in the manufacture of containers for food and drink, automotive parts, wires, cables and structural items for the construction industry.

The following Examples now illustrate the invention.

The polyketone used in the following experiments was a terpolymer of ethylene, propylene and carbon monoxide having the following characteristics:

Wt % propylene in polymer: 4.5

Intrinsic Viscosity (dl.g$^{-1}$): 2.83

Density of powder (g cm$^{-3}$) : 0.273

Comparative Test A 37 gms of the polyketone were charged to a Brabender mixer chamber in <90 seconds and the chamber sealed by a ram supporting a 5 kgm weight. The mixer was driven at 60 rpm and heated by oil circulation to a preset temperature of 230° C.

An initial torque of 22 Nm was observed immediately after sealing which increased to 32 Nm after ten minutes. The chamber was opened to reveal a solidified crumb-like material which had clearly crosslinked.

EXAMPLE 1

(according to the Invention)

A blend of polyketone containing 2% AIP and 0.25% octadecylamine was prepared on the 150 gm scale in a one liter bowl of the Papenmeir at ambient temperature and 2500 rpm for 5 minutes. 40 gms of this blend was now tested in the Brabender mixing chamber under the same conditions as above. Initial torque was 22 Nm rising to 24 Nm over 60 minutes.

Comparative Test B 150 gms of the polyketone and 3 gms of aluminium trisisopropoxide (AIP) were blended together at ambient temperature in a Papenmeir Universal High Speed Mixer at 2500 rpm for 5 minutes. 40 gms of this blend was charged to the Brabender mixer chamber and tested under the same conditions as in the previous example. The initial torque was 21 Nm and increased slowly to 23 Nm over a period of 60 minutes at which time it was just beginning to show signs of becoming a crumb.

Comparative Test C

About 40 gms of the blend of Comparative Test B was prepared in two lots of 20 gms by preblending at 30 rpm in a Brabender mixing head heated to 150° C. The powder obtained now was a buff colour. The standard Brabender test was performed at 230° C. as in the previous examples. The initial torque was now lower at 17 Nm than observed when mixing was carried out at ambient (22 Nm) and rose to only 19 Nm. Stability time was now only 50 minutes (taken as the time to peak torque at which onset of crosslinking is anticipated).

EXAMPLE 2

(according to the Invention)

A further 40 gms of the blend prepared in Example 1 was further mixed in the Brabender chamber (in two batches of 20 gms) for five minutes at 30 rpm at 125° C. Subsequently, the blend was subjected to the Brabender test and gave a stability time of 66 minutes and a torque rise from 22 Nm to 25 Nm.

EXAMPLE 3

(according to the Invention)

A further 40 gms of the blend prepared in Example 1 was similarly further mixed in the Brabender in two batches of 20 gms at 150° C. and 30 rpm. In a subsequent Brabender test at 230° C. and 60 rpm, the initial torque registered was reduced to 12 Nm initially rising to 16 Nm after sixty minutes.

The comparative tests and Examples show that a subsequent mixing procedure in which the blend is held at 150° C. causes 8–10 Nm drop in torque over the whole test period. This may be due to better dispersion of the octadecylamine and possibly also the AIP resulting from the fact that they become molten in this temperature range.

EXAMPLE 4 AND 5

(according to the Invention)

In these tests 2% AIP and 1% octadecylamine were employed. In Example 4 the blend was prepared at ambient temperature in the Papenmeir and the initial and final Brabender torques were 20 and 21 Nm after 60 minutes. In Example 5 employing an additional mixing procedure at 150° C. the initial and final torques were 20 and 23 Nm (after 53 mins).

The invention clearly establishes that there is a synergistic interaction between stabiliser and lubricant which is enhanced by mixing above their melt temperatures.

The use of reaction products from the reaction of aluminium trialkoxides with amines as stabilisers is described below.

EXAMPLE 6

(according to the Invention)

A. Preparation of the Stabiliser-Reaction Product of Aluminium trisisopropoxide and 1-Octadecylamine Aluminium trisisopropoxide (21.7 g, 0.1M) was dissolved in anhydrous toluene (100 ml). 1-Octadecylamine (28.7 g, 0.1M) as a slurry with toluene (100 ml) was added dropwise to this solution at 0° C. The mixture was allowed to warm to 25° C. and stirred at 25° C. for 4 hours. The solution was homogeneous by this time. Toluene/isopropanol was then removed by distillation in vacuo at 40° C. followed by pumping under high vacuum at 100° C. to give a waxy solid.

Aluminium content 6.3% w/w For $(C_{18}H_{37}NHAl(OCH(CH_3)_2)_2)_n$ Al=6.5%. Found C, 69.9%; H, 12.1%; N, 3.6% Calculated for $(C_{18}H_{37}NHAl(OCH(CH_3)_2)_2)_n$ C, 69.7%; H, 12.7%; N, 3.4%. 13C NMR spectroscopy indicated that the product contained less than 10% by weight of aluminium trisisopropoxide.

B. Use of the Stabiliser
General Procedure

Polyketone (ethylene-propylene-carbon monoxide) terpolymer was processed on a Brabender Plasticorder, a laboratory batch melt mixer, and the torque on the rotors and the melt temperature were monitored over 30 minutes. On addition of polymer to the mixer the torque rises as the polymer fuses then drops within a few minutes as the polymer melts and the temperature equilibrates and reaches a minimum value. Increase in torque with time beyond this minimum is indicative of increasing viscosity due to crosslinking. Also as the viscosity increases, the melt temperature increases due to the heat of working. A stabilising effect would be manifested as a reduction in the rate of torque increase and melt temperature increase. The mixing was carried out with a rotor speed of 60 rpm and an initial temperature of 215°±2° C. under a nitrogen atmosphere, achieved by a flow of nitrogen passing around the rotor shaft and also over the top of the ram. The stabiliser was crushed to a powder and mixed using a spatula with the polymer powder in a beaker prior to processing. 36 g of polymer were charged to the mixing chamber in each run.

The melt flow rate (MFR) of the polymer was measured using a Davenport Melt Index Tester at 240° C. under either a 5 kg or a 21.6 kg load. The melt flow rate was taken as the 30 second flow 3 minutes after charging the material into the barrel of the instrument at temperature. Otherwise standard procedures were followed (ASTM D 1238-86). A decrease in MFR after processing a given material is indicative of increased viscosity due to crosslinking reactions. A stablising effect is evidenced by protection of/limitation of such a melt flow ratio drop.

B1. Two batches of polyketone powder, one having intrinsic viscosity (measured at 30° C. in m-cresol) of 1.40 $dlg^{-1}$ and melting point 200° C. (the peak of the endotherm measured by DSC scanning at 10° C. $min^{-1}$) and the other having intrinsic viscosity 1.45 $dlg^{-1}$ and melting point 201° C., were dry blended by mechanical shaking. The melt flow rate of the powder mixture was 41 g/10 min at 240° C. and 5 kg. Details of processing response with and without the product of Example 6 Al being present are given below.

| | Brabender Processing Response | | | Resultant |
|---|---|---|---|---|
| Stabilizer Loading (pph) | Minimum Torque (gm) | Final Torque (gm) | Final Melt Temp. (°C.) | Melt Flow Rate @ 5 kg, 240° C. (g/10 min) |
| 0 | 730 | 1270 | 233 | no flow |
| 2 | 780 | 970 | 225 | 7.2 |

B2. Two batches of polyketone powder, one having an intrinsic viscosity of 1.52 $dlg^{-1}$ and melting point 195° C. and the other having an intrinsic viscosity of 1.49 $dlg^{-1}$ and melting point 202° C., were dry blended by mechanical agitation/shaking. The melt flow rate of the powder mixture was 28 g/10 min at 240° C. and 5 kg.

Details of the processing response with and without the product of Example 6 Al being present are given below.

| Stabilizer Loading (pph) | Brabender Processing Response | | | Resultant Melt Flow Rate @ 5 kg, 240° C. (g/10 min) |
|---|---|---|---|---|
| | Minimum Torque (gm) | Final Torque (gm) | Final Melt Temp. (°C.) | |
| 0 | 790 | 1390 | 245 | no flow |
| 1 | 780 | 990 | 226 | 6.3 |

B3. A single batch of polyketone with intrinsic viscosity of 2.1 dlg$^{-1}$ and melting point 215° C. was used. Details of the processing response with and without the product of Example 6 Al being present are given below. The melt flow rate of the powder prior to processing was 26 g/10 min at 240° C. and 21.6 kg.

| Stabilizer Loading (pph) | Brabender Processing Response | | | Resultant Melt Flow Rate @ 5 kg, 240° C. (g/10 min) |
|---|---|---|---|---|
| | Minimum Torque (gm) | Final Torque (gm) | Final Melt Temp. (°C.) | |
| 0 | 1700 | 265 | 250* | no flow |
| 1 | 1590 | 2450 | 265 | 0.9 |

*after 6 minutes - whereas the sample with the stabiliser was processed for 30 minutes.

EXAMPLE 7

The following compounds:

(a) tris(diisopropylamino) aluminium (b) di(isopropoxy) (diisopropylamino) aluminium (c) isopropoxy bis(diisopropylamino) aluminium (d) tris(dodecylamino) aluminium were prepared.

(a) and (d) were prepared by the method of J K Ruff (J. Amer. Chem. Soc. 1961, 83 2835); (a) was then further reacted with 1 and 2 equivalents of isopropanol to give (c) and (b) respectively.

The above compounds were then incorporated into a polyketone and tested as described below.

A polyketone with intrinsic viscosity (measured at 30° C. in m-cresol) of 1.55 d/g$^{-1}$, melting point (peak of DSC endotherm on scanning at 10° C./min.). 200° C. and melt flow rate (240° C., 5 kg) of 20 g/10 min. was mixed with stabilising additives as described below. Details of the processing response with and without stabiliser are given in Table I.

Incorporation of Additives into Polymer

Polyketone powder was added to a glass flask and was subsequently dried at 70° C. under vacuum for several hours. Under dry, inert conditions the required amount of stabiliser was dissolved in dry toluene. This solution was then added to the dry polymer powder in the glass flask under inert conditions. The powder was slurried with the solution and the toluene was subsequently removed by vacuum distillation leaving the stabiliser impregnated on the polymer powder. The polymer/stabiliser mixture was stored under dry, inert conditions.

Polymer Processing Evaluation

The polymer was processed as described in Example 6B except that the mixing was carried out at an initial temperature of 212°±2° C.

TABLE I

| Sta-biliser | Stabiliser Level (pph) | Brabender Processing Response | | | Resultant Melt Flow Rate @ 240° C. (g/10 min.) | |
|---|---|---|---|---|---|---|
| | | Minimum Torque (Nm) | Final Torque (Nm) | Final Melt Temp. (°C.) | 5 kg | 21.6 kg |
| None | — | 6.8 | 16.0 | 240 | no flow | no flow |
| a | 1.0 | 8.7 | 12.3 | 235 | 2.2 | 33 |
| b | 1.0 | 12.1 | 13.1 | 227 | 1.8 | 31 |
| c | 1.0 | 9.5 | 14.1 | 235 | 0.7 | 13 |
| d | 1.0 | 8.6 | 17.8 | 250 | no flow | 1.7 |

We claim:

1. A polymer composition stabilized against degradation during melt processing which comprises (a) a major amount of a polymer of carbon monoxide and at least one olefin; (b) a minor amount of a first stabilizer comprising an aluminum trialkoxide or an aluminum containing hydrolysis product thereof and (c) an amount in the range 0.05 to 3% by weight of the composition of a second stabilizer comprising an aliphatic mono-amine containing from 12 to 20 carbon atoms.

2. A polymer composition as claimed in claim 1 wherein the first stabiliser is aluminium tris(isopropoxide) or an aluminium containing hydrolysis product thereof.

3. A polymer composition as claimed in claim 1 wherein the first stabiliser is present in an amount in the range 1 to 2% by weight of the composition.

4. A polymer composition as claimed in claim 1 wherein the first and second stabilisers are incorporated into the polyketone by addition of said first and second stabilisers at a temperature above the melting point of the first stabiliser.

5. A polymer composition as claimed in claim 1 or claim 2 wherein the amine is 1-octadecylamine.

6. A polymer composition stabilized against degradation during melt processing which comprises (a) a major amount of a polymer of carbon monoxide and at least one olefin; (b) a minor amount of a first stabiliser comprising an aluminum trialkoxide or an aluminum containing hydrolysis product thereof; and (c) an amount in the range of 0.05 to 3% by weight of the composition of 1-octadecylamine.

7. A polymer composition stabilized against degradation during melt processing which comprises (a) a major amount of a polymer of carbon monoxide and at least one olefin, and (b) a minor amount of polymer stabilizer characterized in that the polymer stabilizer is the product obtainable by reacting at a temperature of 0° to 120° C. equal molar proportions of an aluminum alkoxide or an aluminum containing hydrolysis product thereof with a primary or secondary aliphatic mono-amine having up to 20 carbon atoms.

8. A polymer composition as claimed in claim 7 wherein the aluminum alkoxide is of the general formula a Al(OR$^2$)$_3$ where R$^2$ is a C$_1$ to C$_{20}$ alkyl, phenyl or substituted phenyl.

9. A polymer composition as claimed in claim 8 wherein R is a C$_1$ to C$_4$ alkyl group.

10. A polymer composition stabilized against degradation during melt processing which comprises (a) a major amount of a polymer of a carbon monoxide and at least one olefin and (b) a minor amount of a polymer stabilizer which is a compound of the formula Al(OR$^2$)$_x$(NR$^3$R$_4$)$_y$ where x is 0 or 1–2, y is 3–x, and R$^2$ is a C$_1$ to C$_{20}$ alkyl, phenyl or substituted phenyl group and the group NR$^3$R$^4$ is derivable from a primary or secondary mono-amine, R$^3$ and R$^4$ are independently alkyl or aryl groups.

11. A polymer composition as claimed in claim 10 wherein the group $NR^3R^4$ is derivable from a primary or secondary amine having 6 to 20 carbon atoms.

12. A polymer composition as claimed in claim 7, claim 8, claim 9, claim 10 or claim 11, wherein the amount of (b) the polymer stabiliser is in the range 0.1 to 10% by weight of the composition.

13. A polymer composition as claimed in claim 12 wherein the amount of (b) the polymer stabiliser is in the range 0.3 to 3% by weight of the composition.

* * * * *

UNITED STATES PATENT AND TRADEMARK OFFICE
CERTIFICATE OF CORRECTION

PATENT NO.  : 5,508,329
DATED       : April 16, 1996
INVENTOR(S) : JOHN G. DOLDEN and PHILIP K.G. HODGSON It is certified that error appears in the above-indentified patent and that said Letters Patent is hereby corrected as shown below:

Item [57], line 5, correct the spelling of the word "tria_lkoxide"

Item [57], line 5, should read "with an amine"

In the Abstract, l. 8, should read "$Al(OR^2{}_x)(NR^3R^4{}_y)$."

Col. 7, l. 25, third column should read "2650"
Column 8,
Claim 5, lines 1 and 2, strike "or claim 2"

Claim 8, line 2, after "formula" strike "a"
Column 8,
Claim 8, line 3, after "substituted phenyl" insert --group--.

Signed and Sealed this

Twelfth Day of November, 1996

Attest:

BRUCE LEHMAN

*Attesting Officer*    *Commissioner of Patents and Trademarks*